Figure 1:
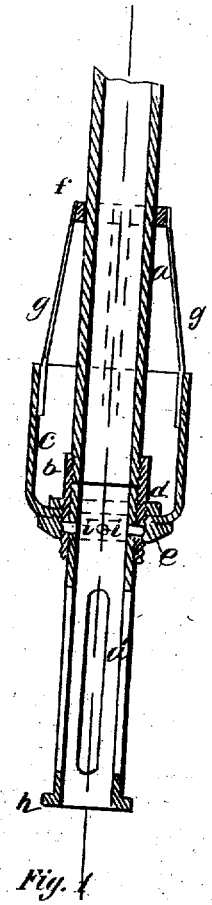

A. D. Griffin,

Well Packing.

No. 3591

Reissued Aug 10. 1869.

R. M. McDonnell
A. Griffin
Witnesses:

Edgar F. Griffin,
Administrator of the Estate of
Anson D. Griffin, Inventor:
by A. B. Rowland
Attorney

United States Patent Office.

EDGAR F. GRIFFIN, OF CHICAGO, ILLINOIS, ADMINISTRATOR OF THE ESTATE OF ANSON D. GRIFFIN, DECEASED.

*Letters Patent No.* 67,749, *dated August* 13, 1867; *reissue No.* 3,591, *dated August* 10, 1869.

IMPROVEMENT FOR PACKINGS FOR DEEP WELLS.

The Schedule referred to in these Letters Patent and making part of the same.

*To all whom it may concern:*

Be it known that ANSON D. GRIFFIN, of the city of Titusville, county of Crawford, and State of Pennsylvania, invented certain new and useful Improvements in Packing for Artesian Wells; and I do hereby declare that the following is a full, clear, and exact description thereof, reference being had to the accompanying drawings, forming part of this specification.

The invention relates to an improved arrangement of packing, to be applied to the outer tubing of oil or other artesian wells, for the purpose of shutting off the surface-water, while drilling or pumping the well, and the several parts are so arranged that the object is attained without the use of seed, or any similar material, and the packing may be withdrawn and replaced at pleasure, without material injury to any of its parts.

In the drawings—

Figure 2:
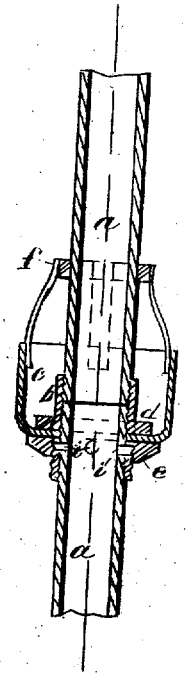

Figure 1 represents a vertical section of the packing, as applied to the casing of a well, and Figure 2, a vertical section of the same, as applied to the tubing of a well, showing a shorter bag than that represented in fig. 1.

*a* represents a joint of the outer tubing or casing of the well, around which the packing is applied.

*a'* is a piece of casing, perforated or slotted, and with a shoulder upon its lower end, as shown, and the two pieces *a* and *a'* are united by means of a collar or thimble, *b*, which has a thread cut upon the lower part of its outer surfaces.

*c* is an annular bag, of leather or other flexible material, open at the top, and having its lower edge crimped, and held firmly upon the casing, between and by means of a fast collar, *d*, and detachable screw-collar, *e*.

Said collar *e* is screwed firmly upon the thimble by a left-hand thread, or a thread opposite to that by which the several thimbles and joints of the casing *a* are attached, and is preferably provided with small spurs upon its upper side, to penetrate the leather, or its upper surface may be roughened, to accomplish the same result.

In the long bag shown in fig. 1, the upper end of the bag is secured to a loose ring, *f*, upon the casing, by means of springs *g g*, say three or four in number, extending from the top of the bag to the loose collar, as shown, their office being to keep the bag expanded, while the water below it is being exhausted, and also, to prevent the bag from dropping, when loosened, as hereinafter explained.

When thus arranged upon the casing or tubing *a*, the whole is lowered into the well to its required position, and as the water below the packing is exhausted by pumping, the pressure or weight of the column of water above the bag, and around the casing *a*, presses and holds the bag firmly against the sides of the well, and effectually prevents any leakage.

When it is required to loosen and remove the bag and casing from the well, (bearing in mind that the joints of the casing are connected, by right-hand screw-threads and the collar *e*, upon the thimble, by a left-hand thread,) it is simply necessary to turn or revolve the casing *a* to the right, as in screwing it together, when (the collar *e* and bag *c* being kept from turning by the friction of the collar upon the bag, and of the bag upon the sides of the well,) the entire casing *a*, carrying with it the thimble *b* and collar *d*, is unscrewed and withdrawn from the collar *e*, and the latter drops upon the shoulder *h* on the tube *a'*, the lower edge of the bag is released, and the whole bag drops, and hangs upon the loose ring *f*, the latter being caught in its descent by the thimble *b*. The well at once fills with water, and the whole apparatus may be easily removed.

Should any loose bits of rock fall from the walls of the well into the bag, as is frequently the case, they will pass through the slots in the tube A', or if too large to pass them, or outside of the collar *e*, the latter may, by the application of leverage power to the casing, be stripped from the piece *a'*, and left in the well, from which it may be afterward removed.

Under the above arrangement for loosening the bag, the well is instantly flooded with water. In some cases such a course is liable to injure the subsequent production of the well, and it is desirable to provide some means by which the well may be gradually filled with water. This is accomplished by the following arrangement:

In the drawings several apertures, *i i*, through the casing and thimble, are shown. When put together ready for use, these apertures are covered by one of the collars *d* or *e*, and when the bag is released, as above described, no use is made of them, but when it is desirable to fill the well slowly, it may be done through and by means of said apertures.

In this case each of the collars *d* and *e* is applied by a left-hand screw-thread.

In order to fill the well slowly with this arrangement, or to feed a small quantity of water to the pump, (when but one tube is used, as in fig. 2,) it is only necessary to revolve the tubing *a* to the right, as before, until the apertures *i i* are wholly or partially exposed above the collars *d* and *e*, when the water above the bag passes through said apertures into the tube *a*, and thence to the pump or bottom of the well. The packing may then be withdrawn, or the apertures may be closed again at pleasure, by revolving the tubing *a* to the left, without injuring or changing the position of the bag.

Having thus described said improvements,

What I claim as the invention of ANSON D. GRIFFIN, and desire to secure by Letters Patent, is—

1. The described arrangement and combination of the collars *d* and *e*, bag *c*, and casing or tubing *a*, the collar *e* being attached by a screw-thread, opposite to that connecting the several joints of casing or tubing, and operating substantially as and for the purposes set forth.

2. The loose sliding ring *f*, arranged with relation to the bag and tubing, substantially as and for the purposes set forth.

3. The springs *g g*, in combination with the bag *c* and loose ring *f*, as and for the purposes set forth.

4. The slotted casing *a'*, with its shoulder *h*, arranged in relation to the bag *c*, as and for the purposes set forth.

5. The apertures *i i* in the tubing *a*, arranged with relation to the bag and collars *d* and *e*, substantially as and for the purposes set forth.

EDGAR F. GRIFFIN,
*Administrator of the Estate of Anson D. Griffin.*

Witnesses:

JOSEPH A. SLEEPER,
W. J. DURHAM.